United States Patent
Olsson

(10) Patent No.: US 12,456,734 B2
(45) Date of Patent: Oct. 28, 2025

(54) SOLID-STATE BATTERY LAYER STRUCTURE AND METHOD FOR PRODUCING THE SAME

(71) Applicant: Epinovatech AB, Lund (SE)

(72) Inventor: Martin Andreas Olsson, Lund (SE)

(73) Assignee: Epinovatech AB, Lund (SE)

( * ) Notice: Subject to any disclaimer, the term of this patent is extended or adjusted under 35 U.S.C. 154(b) by 874 days.

(21) Appl. No.: 17/658,603

(22) Filed: Apr. 8, 2022

(65) Prior Publication Data

US 2022/0231298 A1    Jul. 21, 2022

Related U.S. Application Data

(60) Division of application No. 17/302,907, filed on May 14, 2021, now Pat. No. 11,316,165, which is a (Continued)

(30) Foreign Application Priority Data

Jan. 24, 2020 (EP) ..................... 20153593

(51) Int. Cl.
*H01M 4/04* (2006.01)
*H01M 4/134* (2010.01)
(Continued)

(52) U.S. Cl.
CPC ......... *H01M 4/624* (2013.01); *H01M 4/0426* (2013.01); *H01M 4/0428* (2013.01); (Continued)

(58) Field of Classification Search
None
See application file for complete search history.

(56) References Cited

U.S. PATENT DOCUMENTS

| 2,463,073 A | 3/1949 | Webb |
| 4,103,325 A | 7/1978 | Hyman et al. |
| | (Continued) | |

FOREIGN PATENT DOCUMENTS

| CA | 2024133 | 8/1994 |
| CN | 1599099 | 3/2005 |
| | (Continued) | |

OTHER PUBLICATIONS

Myers et al., "Diffusion, release, and uptake of hydrogen in magnesium-doped gallium nitride: Theory and experiment," Journal of Applied Physics, vol. 89, No. 6, Mar. 15, 2001, pp. 3195-3202.

(Continued)

*Primary Examiner* — Haixia Zhang
(74) *Attorney, Agent, or Firm* — Knobbe, Martens, Olson & Bear, LLP

(57) ABSTRACT

This disclosure is directed toward a method for producing a solid-state battery layer structure. The method may include providing an anode layer comprising silicon, forming a plurality of nanowire structures including silicon and/or gallium nitride on the anode layer and depositing a solid electrolyte layer on the anode layer. In some examples, the method may also include depositing a cathode layer on the solid electrolyte layer, depositing a cathode current collector metal layer on the cathode layer, etching holes through the anode layer, filling the holes with an electrically conducting material; and depositing an anode current collector metal layer on a bottom surface of the anode layer.

7 Claims, 7 Drawing Sheets

Related U.S. Application Data continuation of application No. PCT/EP2021/051422, filed on Jan. 22, 2021.

(51) Int. Cl.
   *H01M 4/525* (2010.01)
   *H01M 4/62* (2006.01)
   *H01M 4/66* (2006.01)
   *H01M 4/02* (2006.01)

(52) U.S. Cl.
   CPC .......... *H01M 4/134* (2013.01); *H01M 4/525* (2013.01); *H01M 4/661* (2013.01); *H01M 2004/027* (2013.01); *H01M 2004/028* (2013.01)

(56) References Cited

U.S. PATENT DOCUMENTS

| | | |
|---|---|---|
| 4,873,497 A | 10/1989 | Kielmeyer |
| 5,362,972 A | 11/1994 | Yazawa et al. |
| 5,976,957 A | 11/1999 | Westwater et al. |
| 6,306,734 B1 | 10/2001 | Givargizov |
| 6,734,451 B2 | 5/2004 | Eriguchi et al. |
| 6,861,271 B2 | 3/2005 | Chua et al. |
| 7,250,359 B2 | 7/2007 | Fitzgerald |
| 7,432,522 B2 | 10/2008 | Samuelson et al. |
| 7,829,362 B2 | 11/2010 | Fukutani et al. |
| 8,094,223 B1 | 1/2012 | De Wit et al. |
| 8,324,660 B2 | 12/2012 | Lochtefeld et al. |
| 8,334,157 B2 | 12/2012 | Smeeton et al. |
| 8,344,242 B2 | 1/2013 | Fiorenza et al. |
| 8,835,905 B2 | 9/2014 | Wober et al. |
| 9,000,353 B2 | 4/2015 | Seo et al. |
| 9,275,857 B1 | 3/2016 | Hersee |
| 9,379,204 B2 | 6/2016 | Fogel et al. |
| 9,406,709 B2 | 8/2016 | Seo et al. |
| 9,764,950 B2 | 9/2017 | Colinge et al. |
| 9,887,637 B1 | 2/2018 | Shah et al. |
| 9,979,326 B1 | 5/2018 | Zanelato et al. |
| 9,984,872 B2 | 5/2018 | Park et al. |
| 10,263,149 B2 | 4/2019 | Samuelson et al. |
| 10,387,792 B1 | 8/2019 | Ladd et al. |
| 10,439,671 B2 | 10/2019 | Kamgaing et al. |
| 10,742,208 B1 | 8/2020 | Moyer et al. |
| 11,316,165 B2 | 4/2022 | Olsson |
| 11,469,300 B2 | 10/2022 | Olsson |
| 11,634,824 B2 | 4/2023 | Olsson |
| 11,652,454 B2 | 5/2023 | Olsson |
| 11,695,066 B2 | 7/2023 | Olsson |
| 11,955,972 B2 | 4/2024 | Olsson |
| 12,009,431 B2 | 6/2024 | Olsson |
| 12,027,989 B2 | 7/2024 | Olsson |
| 12,068,726 B2 | 8/2024 | Olsson |
| 12,148,821 B2 | 11/2024 | Olsson |
| 2003/0022395 A1 | 1/2003 | Olds |
| 2003/0165418 A1 | 9/2003 | Ajayan |
| 2005/0064291 A1 | 3/2005 | Sato et al. |
| 2005/0159000 A1 | 7/2005 | Ohno et al. |
| 2005/0189566 A1 | 9/2005 | Matsumoto et al. |
| 2006/0060866 A1 | 3/2006 | Tezen |
| 2006/0134883 A1 | 6/2006 | Hantschel |
| 2006/0189018 A1 | 8/2006 | Yi |
| 2006/0216815 A1 | 9/2006 | Cheng et al. |
| 2007/0108435 A1 | 5/2007 | Harmon |
| 2007/0197396 A1 | 8/2007 | Holcomb |
| 2007/0215899 A1 | 9/2007 | Thomas |
| 2007/0277866 A1 | 12/2007 | Sander et al. |
| 2007/0295993 A1 | 12/2007 | Chen et al. |
| 2008/0001169 A1 | 1/2008 | Lochtefeld |
| 2008/0122418 A1 | 5/2008 | Biere et al. |
| 2008/0153000 A1 | 6/2008 | Salot et al. |
| 2008/0171424 A1 | 7/2008 | Li |
| 2009/0269909 A1 | 10/2009 | Kim |
| 2010/0097027 A1 | 4/2010 | Jackson |
| 2010/0176459 A1 | 7/2010 | Wernersson et al. |
| 2010/0259186 A1 | 10/2010 | Ernoux |
| 2010/0276664 A1 | 11/2010 | Hersee |
| 2010/0276665 A1 | 11/2010 | Wang |
| 2010/0314617 A1 | 12/2010 | Ito |
| 2011/0020704 A1 | 1/2011 | Fukuchi |
| 2011/0036396 A1 | 2/2011 | Jayaraman |
| 2011/0140072 A1 | 6/2011 | Varangis |
| 2011/0143472 A1 | 6/2011 | Seifert |
| 2011/0204381 A1 | 8/2011 | Okada et al. |
| 2011/0233575 A1 | 9/2011 | Huang et al. |
| 2011/0253187 A1 | 10/2011 | Ohta et al. |
| 2011/0305950 A1 | 12/2011 | Kuriki et al. |
| 2012/0001153 A1 | 1/2012 | Hersee |
| 2012/0052560 A1 | 3/2012 | Knight et al. |
| 2012/0235117 A1 | 9/2012 | Takashi et al. |
| 2012/0292592 A1 | 11/2012 | Hwang et al. |
| 2013/0061747 A1 | 3/2013 | Turnbull et al. |
| 2013/0126907 A1 | 5/2013 | Kitano et al. |
| 2013/0175501 A1 | 7/2013 | Hersee |
| 2013/0187627 A1 | 7/2013 | Imada et al. |
| 2013/0292683 A1 | 11/2013 | Shah |
| 2014/0008609 A1 | 1/2014 | Chiu |
| 2014/0078781 A1 | 3/2014 | Imada |
| 2014/0134773 A1 | 5/2014 | Rakesh et al. |
| 2014/0183446 A1 | 7/2014 | Nago et al. |
| 2014/0197130 A1 | 7/2014 | Lemke |
| 2014/0231870 A1 | 8/2014 | Hoke |
| 2014/0239346 A1 | 8/2014 | Green et al. |
| 2015/0014631 A1 | 1/2015 | Ohlsson |
| 2015/0060996 A1 | 3/2015 | Colinge |
| 2015/0076450 A1 | 3/2015 | Weman |
| 2015/0084685 A1 | 3/2015 | Hirose et al. |
| 2015/0118572 A1 | 4/2015 | Lund et al. |
| 2015/0155275 A1 | 6/2015 | Bahramian et al. |
| 2015/0171784 A1 | 6/2015 | Lipo et al. |
| 2015/0236134 A1 | 8/2015 | Zhong et al. |
| 2015/0263100 A1 | 9/2015 | Deboy |
| 2015/0311072 A1 | 10/2015 | Aagesen |
| 2015/0318448 A1 | 11/2015 | Nan et al. |
| 2015/0333216 A1 | 11/2015 | Pourquire |
| 2016/0172305 A1 | 6/2016 | Sato |
| 2016/0211789 A1 | 7/2016 | Hanft et al. |
| 2016/0276433 A1 | 9/2016 | Holland |
| 2017/0002471 A1 | 1/2017 | Okamoto |
| 2017/0062213 A1 | 3/2017 | Patolsky |
| 2017/0110332 A1 | 4/2017 | Beveridge |
| 2017/0125574 A1 | 5/2017 | Chowdhury et al. |
| 2017/0178971 A1 | 6/2017 | Merckling et al. |
| 2017/0200820 A1 | 7/2017 | Conway et al. |
| 2017/0229569 A1 | 8/2017 | Chowdhury et al. |
| 2017/0257025 A1 | 9/2017 | Meiser |
| 2017/0309736 A1 | 10/2017 | Huang et al. |
| 2017/0323788 A1 | 11/2017 | Mi |
| 2017/0338277 A1 | 11/2017 | Banna et al. |
| 2018/0033889 A1 | 2/2018 | Yang et al. |
| 2018/0229618 A1 | 8/2018 | Lee et al. |
| 2018/0240797 A1 | 8/2018 | Yokoyama et al. |
| 2018/0316383 A1 | 11/2018 | Kamgaing et al. |
| 2019/0013404 A1 | 1/2019 | Carlson et al. |
| 2019/0081164 A1 | 3/2019 | Shrivastava |
| 2019/0088820 A1 | 3/2019 | Danesh et al. |
| 2019/0149031 A1 | 5/2019 | Kitamoto |
| 2019/0165182 A1 | 5/2019 | Van Dal |
| 2019/0189746 A1 | 6/2019 | Makiyama et al. |
| 2019/0214529 A1 | 7/2019 | Ahmed |
| 2019/0229149 A1 | 7/2019 | Yoo |
| 2019/0252377 A1 | 8/2019 | Clarke et al. |
| 2019/0284706 A1 | 9/2019 | Takeda et al. |
| 2019/0356278 A1 | 11/2019 | Smith |
| 2019/0363069 A1 | 11/2019 | Ahmed et al. |
| 2019/0393104 A1 | 12/2019 | Ando |
| 2020/0027972 A1 | 1/2020 | Petta et al. |
| 2020/0127173 A1 | 4/2020 | Park et al. |
| 2020/0161531 A1 | 5/2020 | Olivadese et al. |
| 2020/0185219 A1 | 6/2020 | Busani et al. |
| 2020/0185386 A1 | 6/2020 | Yamazaki et al. |
| 2020/0194416 A1 | 6/2020 | Or-Bach et al. |
| 2020/0203556 A1 | 6/2020 | Feuillet et al. |

(56) References Cited

U.S. PATENT DOCUMENTS

| | | |
|---|---|---|
| 2020/0256710 A1 | 8/2020 | Rule et al. |
| 2020/0381538 A1 | 12/2020 | Shih et al. |
| 2020/0388723 A1 | 12/2020 | Ahmed et al. |
| 2021/0057601 A1 | 2/2021 | Oliver et al. |
| 2021/0265632 A1 | 8/2021 | Olsson |
| 2021/0288539 A1 | 9/2021 | Abdel-Khalik et al. |
| 2021/0327712 A1 | 10/2021 | Olsson |
| 2022/0302293 A1 | 9/2022 | Olsson |
| 2022/0376096 A1 | 11/2022 | Wu |
| 2022/0393656 A1 | 12/2022 | Olsson |
| 2022/0396886 A1 | 12/2022 | Olsson |
| 2022/0399826 A1 | 12/2022 | Olsson |
| 2022/0416025 A1 | 12/2022 | Olsson |
| 2023/0119801 A1 | 4/2023 | Olsson |
| 2023/0146820 A1 | 5/2023 | Olsson |
| 2023/0261621 A1 | 8/2023 | Olsson |
| 2023/0327009 A1 | 10/2023 | Olsson |
| 2023/0352575 A1 | 11/2023 | Olsson |
| 2024/0186365 A1 | 6/2024 | Olsson |
| 2024/0235412 A1 | 7/2024 | Olsson |
| 2024/0250686 A1 | 7/2024 | Olsson |
| 2024/0332423 A1 | 10/2024 | Olsson |
| 2024/0356456 A1 | 10/2024 | Olsson |
| 2024/0363693 A1 | 10/2024 | Olsson |
| 2024/0380369 A1 | 11/2024 | Olsson |
| 2025/0040175 A1 | 1/2025 | Olsson |
| 2025/0063732 A1 | 2/2025 | Olsson |
| 2025/0081501 A1 | 3/2025 | Olsson |
| 2025/0158070 A1 | 5/2025 | Olsson |
| 2025/0160056 A1 | 5/2025 | Olsson |
| 2025/0169121 A1 | 5/2025 | Olsson |

FOREIGN PATENT DOCUMENTS

| | | |
|---|---|---|
| CN | 101621292 | 5/2012 |
| CN | 101765934 | 3/2013 |
| CN | 103477418 | 12/2013 |
| CN | 105659383 | 6/2016 |
| CN | 105914232 | 8/2016 |
| CN | 105990443 | 10/2016 |
| CN | 106549050 | 3/2017 |
| CN | 108701672 | 10/2018 |
| CN | 110324568 | 10/2019 |
| CN | 110336028 | 3/2021 |
| CN | 112490243 | 3/2021 |
| EP | 1959530 | 8/2008 |
| EP | 2075745 | 7/2009 |
| EP | 2571065 | 3/2013 |
| EP | 2816729 | 12/2014 |
| EP | 284700 | 1/2015 |
| EP | 2838125 | 2/2015 |
| EP | 2955763 | 12/2015 |
| EP | 4082037 | 11/2022 |
| GB | 2520687 | 6/2015 |
| JP | H09246471 | 9/1997 |
| JP | 2000101152 | 4/2000 |
| JP | 2003101069 | 4/2003 |
| JP | 2005268555 | 9/2005 |
| JP | 2008057383 | 3/2008 |
| JP | 2009152189 | 7/2009 |
| JP | 2010232423 | 10/2010 |
| JP | 2011529639 | 12/2011 |
| JP | 2012018919 | 1/2012 |
| JP | 2014146744 | 8/2014 |
| JP | 2014217252 | 11/2014 |
| JP | 2015198549 | 11/2015 |
| JP | 2016135000 | 7/2016 |
| JP | 2018050419 | 3/2018 |
| JP | 2019092292 | 6/2019 |
| JP | 2019114581 | 7/2019 |
| JP | 2020061510 | 4/2020 |
| KR | 10-1997-0042276 | 7/1997 |
| KR | 10-1998-0076226 | 11/1998 |
| KR | 10-2013-0030193 | 3/2013 |
| KR | 10-2019-0015134 | 2/2019 |
| TW | 201036347 | 10/2010 |
| WO | WO 95/08452 | 3/1995 |
| WO | WO 2010/01412 | 1/2010 |
| WO | WO 2010/100599 | 9/2010 |
| WO | WO 2012/077513 | 6/2012 |
| WO | WO 2012/105901 | 8/2012 |
| WO | WO 2013/049817 | 4/2013 |
| WO | WO 2017/038403 | 3/2017 |
| WO | WO 2017/111844 | 6/2017 |
| WO | WO 2017/213644 | 12/2017 |
| WO | WO 2019/144966 | 8/2019 |
| WO | WO 2019/202258 | 10/2019 |
| WO | WO 2020/222149 | 11/2020 |
| WO | WO 2021/021415 | 2/2021 |

OTHER PUBLICATIONS

Nabi et al., "Photoluminescence and hydrogen storage properties of gallium nitride hexagonal micro-bricks," ScienceDirect, vol. 79, Jul. 15, 2012, pp. 212-215.

Anonymous, "High-electron-mobility transistor—Wikipedia", Mar. 6, 2020 (Mar. 6, 2020), XP055808423, Retrieved from the Internet: URL:https://en.wikipedia.org/w/index.php?title=High-electron-mobilitytransistor&old id=944233239, retrieved on May 27, 2021 6 pages.

Anonymous, "Phase-shift oscillator Wikipedia" Apr. 7, 2019 (Apr. 7, 2019), XP055733459, Retrieved from the Internet: URL:https://en.wikipedia.org/w/index.php?title=Phase-shift-oscillator&oldid=89138949 5, retrieved on Sep. 23, 2020 in 3 pages.

Asghar Asgari, "Negative Differential Capacitance of AlGaN/GaN Heterostructure in Presence of InN Quantum Dots", SPIE, PO Box 10 Bellingham WA 98227-0010 USA, Jan. 1, 2008.

Cai et al, Monolithically Integrated Enhancement-and Depletion-Mode AlGaN/GaN HEMT for gaN Digital Integrated Circuits, vol. 53, No. 9, Sep. 1, 2006 (Sep. 1, 2006), pp. 2223-2230.

Chebrolu et al., "Recent progress in quantum dot sensitized solar cells: an inclusive review of photoanode, sensitizer, electrolyte, and the counter electrode", Journal of Materials Chemistry C 2019, pp. 4911-4933.

Dahal et al., "Realizing InGaN monolithic solar-photoelctrochemical cells for artificial photosynthesis", Appl. Phys, Lett. 104, 143901, (2014); Published Onlines: Apr. 9, 2014.

Doring et al., "Technology of GaN-Based Large Area CAVETs With Co-Integrated HEMTs," IEEE Transactions on Electron Devices, vol. 68, No. 11, Nov. 2021, pp. 5547-5552.

Eickhoff et al., "Piezoresistivity of Alx Ga1—xN layers and Alx Ga10xN/GaN heterostructures," Journal of Applied Physics, American Institute of Physics, vol. 90, No. 7, Oct. 1, 2001, pp. 3383-3386.

Enthaler et al, "Carbon dioxide and formic acid-the couple for environmental-friendly hydrogen storage?", Energy & Enviormental Science, 2010 pp. 1207-1217.

Faunce et al., "Nanotechnology, Plasma, Hydrogen from Artificial Photosynthesis, and Fuel Cells: Powering the Developing World to the Sustainocene", Nanotechnology Toward the Sustoinocene, Chapter 11, pp. 241-257.

Fujii et al., "Photoelectrochemical Properties of Ingan For H2 Generation From Aqueous Water", Japanese Journal of Applied Physics, Japan Society Of Applied Physics, JP, vol. 44, No. 10, Oct. 11, 2005 (Oct. 11, 2005), pp. 7473-7435.

Gust et al., "Solar Fukes via Artificial Photosynthesis", Department of Chemistry and Biochemistry and Center for Bioenergy and Photosynthesis, Arizona State University, Jul. 17, 2009, in 9 pages.

Iqbal et al. "Reactive Sputtering of Aluminum Nitride Thin Files for Piezoeletric Applications: A Review", Sensors, vol. 18, No. 6, Jun. 2018 in 21 pages.

Jones et al., "Review of Commercial GaN Power Devices and GaN-Based Converter Design Challenges," IEEE, vol. 4, No. 3, Sep. 2016, pp. 707-719.

Kampl et al., "2500 W full-bridge totem-pole power factor correction using CoolGaN," Nov. 5, 2018, pp. 1-46.

Kozodoy et al. "Polarization-enhanced Mg doping of AlGaN/GaN superlattices," Applied Physics Letters, vol. 75, No. 16, Oct. 18, 1999, pp. 2444-2446.

(56) References Cited

OTHER PUBLICATIONS

Krishna et al. "AlGaN/GaN Superlattice-Based p-Type Field-Effect Transistor with Tetramethylammoninum Hydoxide Treatment," Physica Status Solidi, vol. 217, No. 7, Apr. 1, 2020 in 8 pages.
Kumar et al. "Quantum dot activated indium gallium nitride on silicon as photoanode for solar hydrogen generation", Communcations Chemestry, in 7 pages.
Lan et al., "Efficienty improvement of the Light-emitting diodes by the lateral overgrowth GaN on an AlN nanorod template," 14th International Conference on Solid State Lighting and LED-based Illumination Systems 957100 SPIE, Sep. 8, 205 in 7 pages.
Lin et al., "Physical and electrical characteristics of AlGaN/GaN metal-oxide-semiconductor high-electron-mobility transistors with rare earth Er2O3 as a gate dielectric", Thin Solid Films, vol. 544, Oct. 2013 (Oct. 2013), pp. 526-529.
Lu et al., "Paralleling GaN E-HEMTs in 10kW-100KW systems," 2017 IEEE Applied Power Electronics Conference and Exposition, Mar. 26, 2017, pp. 3049-3056.
Matioli et al. "Room-Temperature Ballistic Transport in III-Nitride Heterostructures," ResearchGate, https://www.researchgate.net/publication/271329249_Room-Temperature_Ballistic_Transport_in_III-Nitride_Heterostructures/link/57d9301d08ae6399a39acce3/download?_tp=eyJjb250ZXh0Ijp7ImZpcnN0UGFnZSI6InB1Ymxp Y2F0aW9uIiwicGFnZSI6InB1YmxpY2F0aW9uIn19, Jan. 2015, in 10 pages.
Mukhopadhyay, P. "Comparative DC Characteristic Analysis of AlGaN/GaN HEMTs Grown on Si(111) and Sapphire Substrates by MBE" Jour. Of Elec. Mat. vol. 43, No. 4, Feb. 14, 2014 pp. 1263-1270 (Year: 2014).
Nainani, "High-Performance III-V PMOSFET", May 2011, in 131 pages.
Naveed ul Hassan Alvi et al., "InN/InGaN Quantum Dot Photoelectrode: Efficient Hydrogen Generation By Water Splitting At Zero Voltage", Nano Energy, vol. 13, Mar. 6, 2015 (Mar. 6, 2015), pp. 291-297.
Park, J. "Comparison of AlGaN/GaN High Electron Mobility Transistor with AlN or GaN as a cap layer" Conference paper proceedings on Research Gate available online at address recited in the Office Action as of Jul. 14, 2015 pp. 1-2 (Year: 2015).
Park et al., "Integrated silicon microring resonator devices for point-of-care diagnostic applications," Proceedings of SPIE, Marach 8, 2014, vol. 8990, in 8 pages.
Raj et al. "Demonstration of a GaN/AlGaN Superlattice-Based p-Channel FinFET With High ON- current," IEEE Electron Device Letters, vol. 41, No. 2, Dec. 31, 2019, pp. 220-223.
Ramakrishna et al. "Nitrogen doped CNTs supported Palladium electrocatalyst for hydrogen evolution reaction in PEM water electrolyser", International Journal of Hydrogen Energy, 2016 pp. 20447-20454.
Seo et al., "i-based nonalloyed Ohmic contacts for Al0.15Ga0.85N/GaN high electron mobility transistors using regrown n+-GaN by plasma assisted molecular beam epitaxy," Applied Physics Letters, vol. 93, Issue 10, Sep. 8, 2008, pp. 102102-102102.
Shibata, D. "1.7 kV/ 1.0 mΩcm2 Normally-off Vertical GaN Transistor on GaN substrate with Regrown p-GaN/AlGaN/GaN SemipolarGate Structure" IEEE Int. Elec. Dev. Meet. IEDM 2016, Feb. 2, 2017 pp. 248-251 (Year: 2016).
Sritoma et al., "A Novel GaN-Hemt based Inverter and Cascade Amplifier," 2018 IEEE Electron Devices Kolkata Conference (EDKCON), IEEE, Nov. 24, 2018 (Nov. 24, 2018), pp. 465-469.
Tripathy et al., "AlGaN/GaN two-dimensional-electron gas heterostructures on 200 mm diameter Si(111)", Applied Physics Letters, 101, 082110 (2012) https://doi.org/10.1063/1.4746751 Submitted: Feb. 7, 2012 , Accepted: Aug. 1, 2012 , Published Online: Aug. 23, 2012.
Alamo et al., III-V CMOS: the key to sub-10 nm electronics?, Microsystems Technology Laboratories, MIT, 2011 MRS Spring Meeting and Exhibition Symposium P: Interface Engineering for Post-CMOS Emerging Channel Materials.
Wang et al, Germanium-Assisted Direct Growth of Graphene on Arbitrart Dielectric Substrates for Heating Device, Nano Micro Small, vol. 13, No. Jul. 28, 26, 2017.
Sundaram et al, "Single-crystal nanopyramidal BGaN by nanoselective area growth on AlN/Si(111) and GaN templates"., Nanotechnology, vol. 27 (2016) 7 pages.
Tripathy et al., "AlGaN/GaN two-dimensional-electron gas heterostructures on 200 mm diameter Si(111)", Applied Physics Letters, 101, 082110 (2012) https://dol.org/10.1063/1.4746751 Submitted: Feb. 7, 2012 , Accepted: Aug. 1, 2012 , Published Online: Aug. 23, 2012.

SOLID-STATE BATTERY LAYER STRUCTURE AND METHOD FOR PRODUCING THE SAME

TECHNICAL FIELD

The present invention relates to solid-state battery layer structures and methods of fabricating the same.

BACKGROUND

Lithium-ion battery technologies, with their high charge capacity levels and rechargeability, have evolved storage of electrical energy and played a significant part in enabling mobile electronic devices such as portable computers and telephones. Lithium-ion batteries have also been of importance for the resurgence of electric vehicles. However, the by now conventional lithium-ion battery technology comes with its own range of issues. In order to achieve battery improvements, essentially across the entire board, battery device designs featuring solid electrolytes, as opposed to traditional liquid electrolytes, are gaining popularity. Batteries comprising a solid electrolyte are generally referred to as solid-state batteries. While solid electrolytes may be very favorable for e.g. reducing the fire risk of batteries, they also come with a need for novel battery designs in regard to morphology and materials in order to realize their full potential of improved performance compared to liquid electrolyte batteries. In particular, improving solid-state battery charge capacity, defined as a ratio of storable charges to a weight of the battery, has not yet been adequately addressed in the prior art. Additionally, material dependent volume expansion is another issue facing prior art solid-state batteries. There is thus need for improvements within the technical field.

SUMMARY OF THE INVENTION

An object of the present invention is to at least mitigate some of the aforementioned issues and to provide solid-state battery layer structures that enable improved battery charge capacity as well as methods of fabricating the same structures.

According to a first aspect of the present invention there is provided a solid-state battery layer structure comprising:
an anode current collector metal layer;
an anode layer arranged on the anode current collector metal layer;
a solid electrolyte layer arranged on the anode layer laterally;
a cathode layer arranged on the solid electrolyte layer; and
a cathode current collector metal layer,
wherein the anode layer comprises silicon.

The term "arranged on" may refer to having the layers or structures arranged above each other in a vertical direction of the layer structure or stack. The vertical direction may be substantially perpendicular and normal to the surfaces of the layers or structures in the layer structures. The word "comprises" may throughout this disclosure refer to layers and structures at least partially comprising a certain material. The word does not exclude the layer or structure from containing impurities of other materials nor does it exclude the layer or structure substantially consisting of the comprised material.

Such a structure may mitigate some of the issues in the prior art. Silicon anodes may be advantageous for increasing the charge capacity for e.g. lithium-ion based batteries. This is due to silicon atoms, often alloyed to form compound anode materials, are better than carbon atoms, in conventional graphite anodes, at binding to and thus holding a larger number of lithium atoms. Battery charge capacity may be recorded in the units ampere hours or coulombs. Additionally, the use of silicon anodes, may simplify production of the battery layer structure and improve yield as sophisticated techniques and methods commonly used in microelectronic fabrication may be utilized. As such, solid-state batteries may be effectively minaturized. Silicon anodes may be based on monocrystalline substrates. As such, solid-state battery layer structures may be formed more integrally with silicon-based microelectronics. Thus, electronic circuits and devices with integrated solid-state batteries may be both enabled and miniaturized.

The anode layer may comprise gallium nitride.

The use of gallium nitride in the anode layer, e.g. as a thin upper layer of the anode layer otherwise mainly comprising silicon, may mitigate issues in the prior art. The charge capacity of a solid-state battery with a gallium nitride anode material may be ~2.5 times larger than that of a solid-state battery with conventional graphite anodes. The diffusion barrier for lithium-ion diffusion may also be lower with a gallium nitride anode compared to the same barrier for a graphite anode. This may be advantageous for rapid battery charging.

The solid-state battery layer structure may further comprise a plurality of nanowire structures, wherein said nanowire structures are arranged on the anode layer and, wherein said nanowire structures are laterally and vertically enclosed by the solid electrolyte layer.

The term "nanowire structure", also referred to as just nanostructures, may refer to elongated structures with a dimension such as a diameter or a length on the nanometer scale, i.e. 1-100 nm. Nanowire structures may be simple and substantially one-dimensional or contain, along its length, at least one node from which at least two separate branches extend. Such a nanowire structure may be referred to as a nanotree or a nanowire tree structure.

The term "laterally and vertically enclosed" may refer to enclosing the nanowire structures both laterally or radially and vertically or longitudinally. The whole nanowire structures, including all eventual branches, faces, and surfaces, may be covered by solid electrolyte material forming the solid electrolyte layer.

Such an addition of nanowire structures may advantageously increase the effective interface area between the anode and the solid electrolyte and hence also the battery charge capacity and potentially also increase the rate at which charge carrying ions, e.g. lithium ions, may alloy with the anode material. Additionally, the use of nanowire structures may mitigate the volume expansion of some materials during battery operation. E.g. bulk silicon anodes may expand 300-400% during lithiation, i.e. the process of charging a battery when the charge carriers are lithium ions. Nanostructures, such as e.g. nanowires are advantageous as their volume expansion may be much less severe than that of bulk materials. This advantage of nanostructures may be attributed to their volume expansion being more local and distributed as compared to when a bulk layer expands as one piece. This mitigation of the volume expansion issue may be even more relevant for solid electrolyte batteries as solids generally allow for less mechanical movement than liquids. Furthermore, nanostructures such as these may be produced in a structured and well-defined manner and the effective interface area may still be increased even if irregularities would somehow occur.

Each nanowire structure of said plurality of nanowire structures may comprise a vertical stem and a plurality of branches extending from said vertical stem, wherein the vertical stems of said plurality of nanowire structures are arranged perpendicularly to a top surface of the anode layer.

The term "arranged perpendicularly" may refer to arranging the whole nanowire structures, and in particular vertical stems, such that they extend in a substantially perpendicular and normal direction to the top surface of the anode layer. This direction may alternatively be understood as corresponding to the vertical direction of the layer structure. Including tree shaped nanowire structures, comprising both stems and branches, may further increase the effective interface area between the anode and the solid electrolyte and the battery charge capacity. Additionally, the tree shaped nanowire structures may further mitigate the volume expansion issue described in the above.

The plurality of tree shaped nanowire structures, or nanotrees, may be visually compared or likened to a nanoforest.

Said plurality of nanowire structures may comprise silicon.

Such nanowire structures may be advantageous for being relatively easy to form due to the numerous silicon formation and processing methods that are available. As the silicon nanowire structures would effectively extend the anode, the same advantages as those of using silicon as an anode material apply, i.e. the charge capacity may be increased.

Said plurality of nanowire structures may comprise gallium nitride.

Similarly to the above, gallium nitride nanowire structures extending the anode may also improve the charge capacity of the solid-state battery.

The anode layer may comprise a plurality of metal vias connecting the plurality of nanowire structures with the anode current collector metal layer.

As such, a lower resistance or more ohmic conduction path may be provided to the base of the nanowire structures.

The solid electrolyte layer may comprise lithium phosphate.

Lithium phosphate, or compounds comprising lithium phosphate, may be considered advantageous materials for the solid electrolyte layer in a solid-state battery layer structure. Lithium phosphate may allow transport of lithium ions between the anode and cathode of the solid-state battery by solid state diffusion via atomic vacancies in the solid electrolyte material lattice.

The cathode layer may comprise lithium cobalt oxide or another metal oxide.

Lithium cobalt oxide may be considered an advantageous material for the cathode layer.

The cathode current collector metal layer may comprise aluminium.

Aluminium may provide a low resistance or adequately ohmic conduction path to the cathode layer.

The anode current collector metal layer may comprise copper.

Copper may provide a low resistance or adequately ohmic conduction path to the anode layer and if present also to the nanowire structures.

According to a second aspect of the present invention there is provided a method for producing a solid-state battery layer structure, the method comprising:
providing an anode layer;
forming a plurality of nanowire structures on the anode layer, each nanowire structure comprising a vertical stem and a plurality of branches extending from the vertical stem, wherein the vertical stems of the nanowire structures are formed perpendicularly to a top surface of the anode layer;
depositing a solid electrolyte layer on the anode layer, the solid electrolyte layer laterally and vertically enclosing said plurality of nanowire structures;
depositing a cathode layer on the solid electrolyte layer;
depositing a cathode current collector metal layer on the cathode layer; and
depositing an anode current collector metal layer on a bottom surface of the anode layer.

The word "forming" may refer to any method or technique for forming a layer or structure. The word "depositing" may refer to any method or the use of a technique for forming a layer or structure by addition of material. Examples of deposition techniques may include chemical vapor deposition (CVD), physical vapor deposition (PVD), metalorganic vapor-phase epitaxty (MOVPE), sputtering, evaporation, etc. Thus, a step of forming may refer to depositing. The anode current collector metal layer should be understood as beeing deposited on the bottom surface of the anode layer, i.e. not on or above the anode layer when considering the vertical direction of the layer structure or stack.

Such a method may be used to produce solid-state battery layer structures according to the first aspect. Therefore, advantages may closely correspond to those described for the first aspect. In summary, the method may provide a relatively low complexity way to produce a solid-state battery layer structure by using existing, microelectronic, fabrication methods and techniques. Close integration with electronic devices and miniaturization may be enabled by the method.

The method may further comprise etching, from the bottom surface of the anode layer, holes through the anode layer, wherein the step of depositing the anode current collector metal layer on the bottom surface of the anode layer further comprises filling the holes with a same material as a material of the anode current collector metal layer.

This addition of etching and filling may be understood as corresponding to forming the vias to the bases of the nanowire structures as described in the first aspect. Thus, similar advantages and beneficial effect apply. Such backside wafer vias may be provided by plasma etching of silicon oxide or silicon nitride as a hard mask for deep reactive-ion etching (DRIE) of silicon.

The method may further comprise aligning the holes through the anode layer with said plurality of nanowire structures.

As such, a more ideal conduction path between anode contacts and nanowire strucutres may be obtained.

The step of forming said plurality of nanowire structures may comprise:
forming a plurality of stem seed particles on the top surface of the anode layer;
epitaxially growing the vertical stems of said plurality of nanowire structures from said plurality of stem seed particles;
depositing branch seed particles on the vertical stems; and
epitaxially growing the branches of said plurality of nanowire structures from said branch seed particles.

Forming nanowire structures by particle formation, e.g. deposition, and subsequent particle mediated epitaxy may be an effective way to form tree shaped nanowire structures comprising first order nanowire structures, i.e. vertical stems, and second order nanowire structures, i.e. branches wherein the first order nanowire structures act as bases for second order nanowire structures.

The branches may be understood as being grown substantially radially out from the vertical stems. The branch seed particles may be understood as being deposited on radial or lateral surface faces, and along the entire length, of the vertical stems.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting.

It must be noted that, as used in the specification and the appended claims, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will, in the following, be described in more detail with reference to appended figures. The figures should not be considered limiting; instead they should be considered for explaining and understanding purposes.

As illustrated in the figures, the sizes of layers and regions may be exaggerated for illustrative purposes and, thus, are provided to illustrate the general structures. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
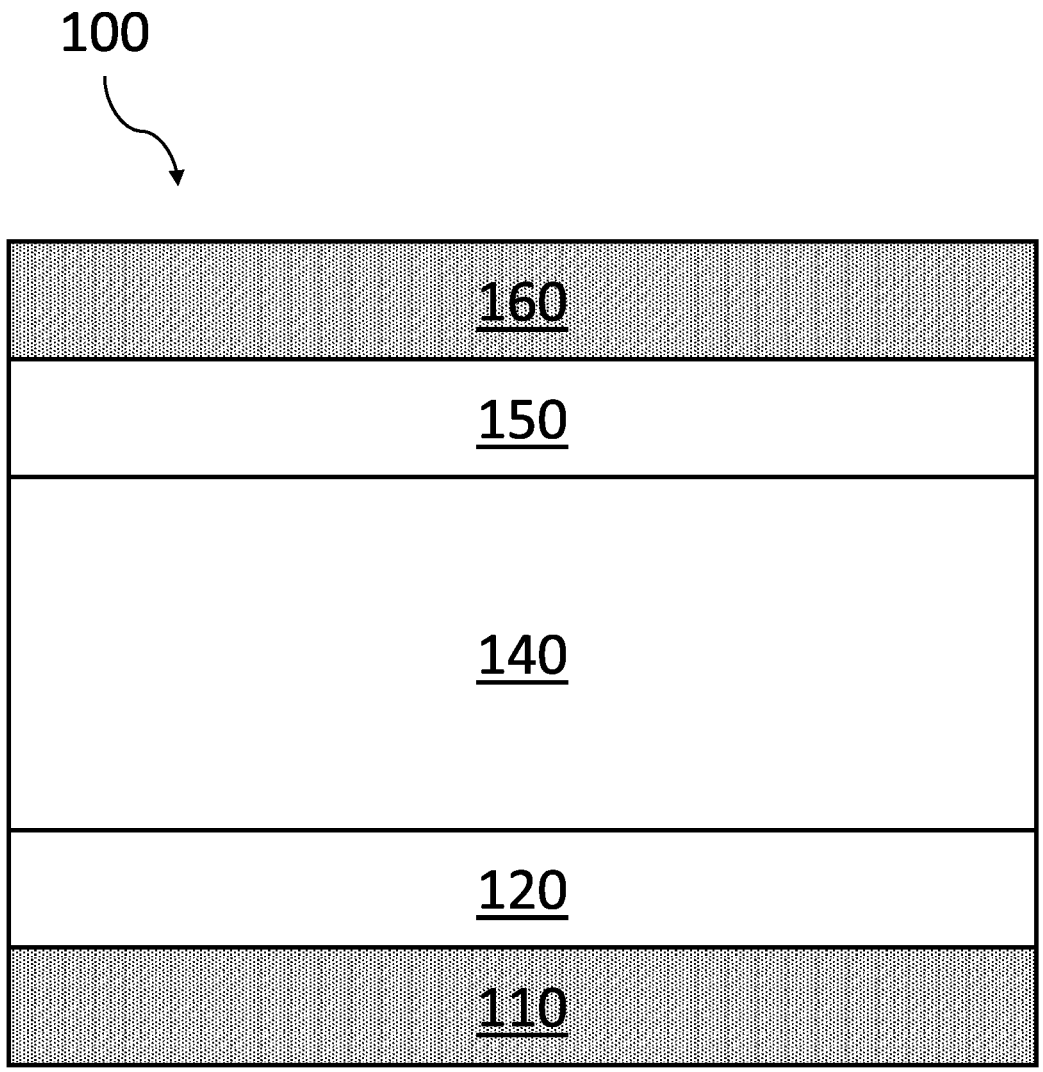
FIG. 1 shows a cross section of a solid-state battery layer structure.

FIG. 1 shows a cross sectional view of a solid-state battery layer structure 100. The solid-state battery layer structure comprises:

an anode current collector metal layer 110;
an anode layer 120 arranged on the anode current collector metal layer;
a solid electrolyte layer 140 arranged on the anode layer laterally;
a cathode layer 150 arranged on the solid electrolyte layer; and
a cathode current collector metal layer 160, wherein the anode layer comprises silicon.

The anode current collector metal layer 110 may comprise or substantially consist of copper. The anode current collector metal layer 110 may alternatively or additionally comprise one of the other metal materials: gold, silver, platina, nickel, titanium, zinc, chromium, tin, lead, manganese, cobalt, and iron. The anode current collector metal layer 110 may comprise an alloy material.

The anode layer 120 may comprise <111> silicon. The anode layer 120 may be a crystaline silicon substrate or wafer. The anode layer 120 may comprise or substantially consist of gallium nitride. The anode layer 120 may comprise a thin upper sublayer of gallium nitride arranged on a lower sublayer of silicon. The anode layer comprising 120 GaN may be passivated with hydrogen. Lithium may be incorporated or alloyed into the anode layer 120.

The solid electrolyte layer 140 may comprise or substantially consist of lithium phosphate ($Li_3PO_4$). The solid electrlyte layer 140 may additionally or alternatively comprise or substantially consist of other materials such as lithium iron phosphate ($Li_3FePO_4$) or lithium phosphorus oxynitride (LiPON).

Other lithium compounds may also be available for the solid electrolyte layer 140.

The solid electrolyte layer 140 may feature atomic vacancies at lithium atom lattice locations to allow for conduction by diffusion of lithium ions through the solid electrolyte layer 140. The solid electrolyte layer 140 may comprise magnesium replacment or impurity atoms to restore the equlibrium of charges in the lattice that may be lost by introducing the lattice lithium vacancies.

The solid electrolyte layer 140 may have a thickness in the range 500-5000 nm.

The cathode layer 150 may comprise or substantially consist of lithium cobalt oxide ($LiCoO_2$). The cathode layer 150 may alternatively or additionally comprise other metal oxide based materials.

The cathode current collector metal layer 160 may comprise or substantially consist of aluminium. The cathode current collector metal layer 160 may alternatively or additionally comprise one of the other metal materials: gold, silver, platina, nickel, titanium, zinc, chromium, tin, lead, manganese, cobalt, and iron. The cathode current collector metal layer 160 may comprise an alloy material.

Figure 2:
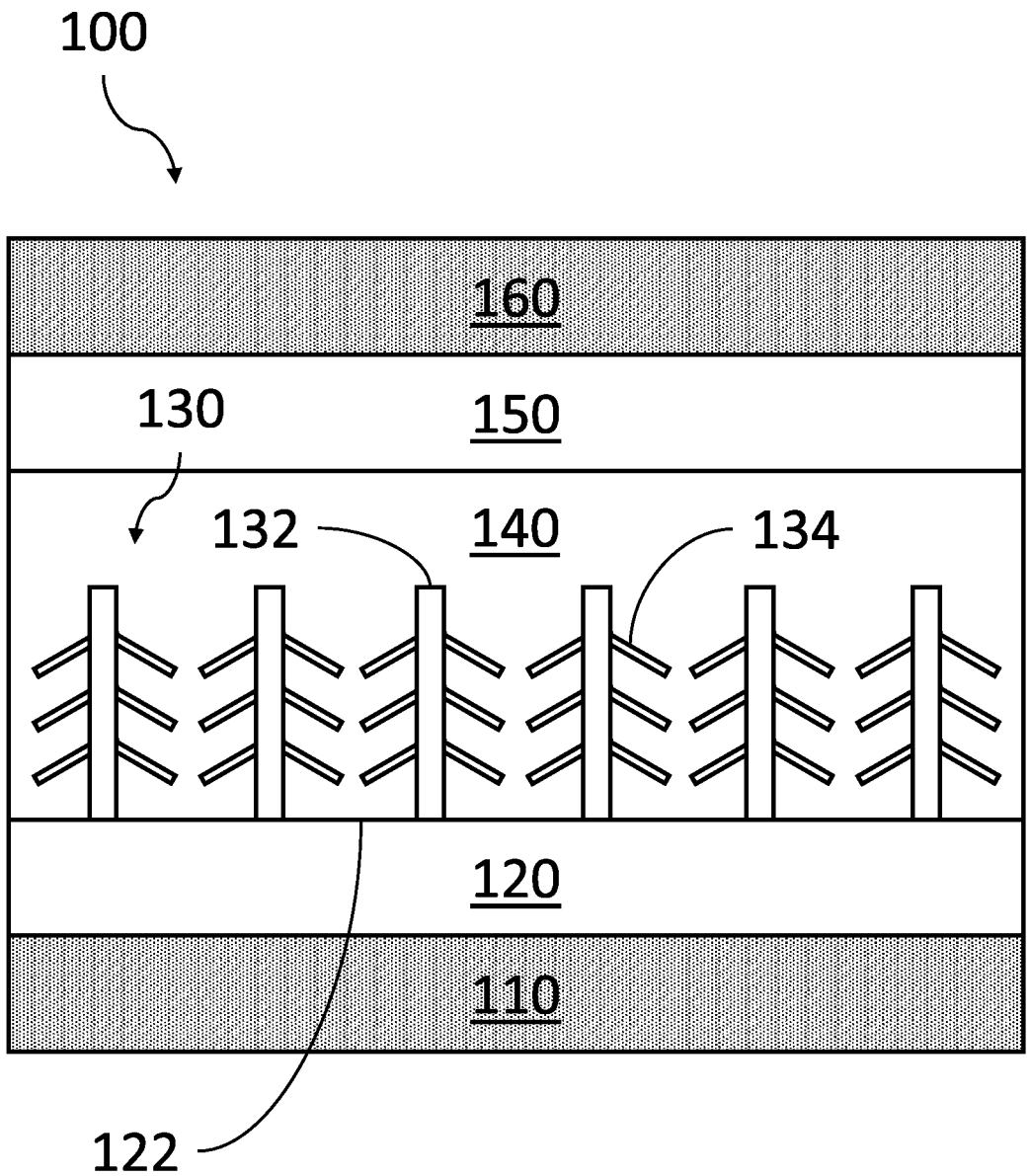
FIG. 2 shows a cross section of a solid-state battery layer structure comprising nanowire structures.

FIG. 2 shows the solid-state battery 100 layer structure further comprising a plurality of nanowire structures 130. Said nanowire structures 130 may be arranged on the anode layer 120. Said nanowire structures 130 may be laterally and vertically enclosed by the solid electrolyte layer 140.

Each nanowire structure 130 of said plurality of nanowire structures may comprise a vertical stem 132 and a plurality of branches 134 extending from said vertical stem 132. The vertical stems of said plurality of nanowire structures may be arranged perpendicularly to a top surface 122 of the anode layer 120.

The nanowire structures 130 may be arranged in a hexagonal pattern on the top surface 122 of the anode layer 120. The vertical stems 132 of the nanowire structures 130 may be arranged with a spacing to the nearest other vertical stem 132 in the range 100-1000 nm. More preferably, the spacing is in the range 250-750 nm. Most preferably, the spacing is in the range 400-600 nm.

The nanowire structures 130 may alternatively be arranged on the anode layer 120 with arbitrary orientations of each individual nanowire structure 130. Such formation may be less complex while still increasing the effective anode-electrolyte interface area.

The vertical stems 132 may have a length in the range 500-5000 nm. More preferably, the length is in the range 1000-3000 nm. Most preferably, the length is in the range 1500 nm-2500 nm.

The branches 134 may have a length in the range 50-500 nm. More preferably, the length is in the range 50-250 n. Most preferably, the length is in the range 50-150 nm.

Said plurality of nanowire structures may comprise or substantially consist of silicon. Said nanowire structures 130 may comprise crystaline silicon with a crystal lattice direction <111> corresponding to the vertical direction of the nanowire structures.

Said plurality of nanowire structures may comprise or substantially consist of gallium nitride. Said nanowire structures 130 may comprise crystaline gallium nitride with a crystal lattice direction <0001> corresponding to the vertical direction of the nanowire structures. Gallium nitride nanowire structures 130 may feature a hydrogen passivation layer on the surfaces and faces of the nanowire structures 130 to saturate unsaturated dangling bonds at the gallium nitride surface.

The nanowire structures 130 may incorporate or alloy Li into their surface or bulk lattice.

Figure 3:
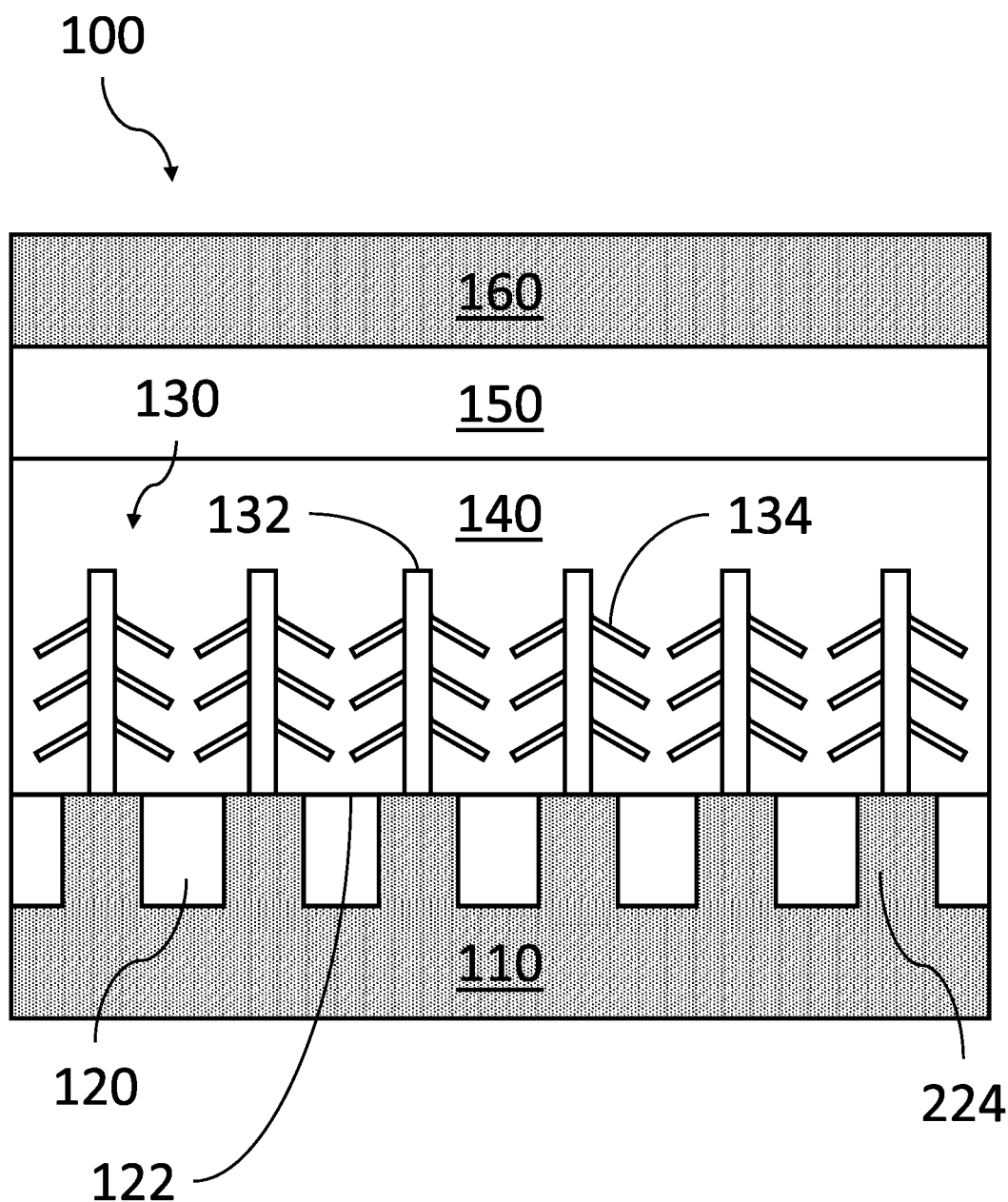
FIG. 3 shows a cross section of a solid-state battery layer structure comprising nanowire structures and vias.

FIG. 3 shows the anode layer 120 comprising a plurality of metal vias 224 connecting the plurality of nanowire structures 130 with the anode current collector metal layer 110. The metal vias 224 may comprise or substantially consist of a same material existing in the anode current collector metal layer 110.

Figure 4:
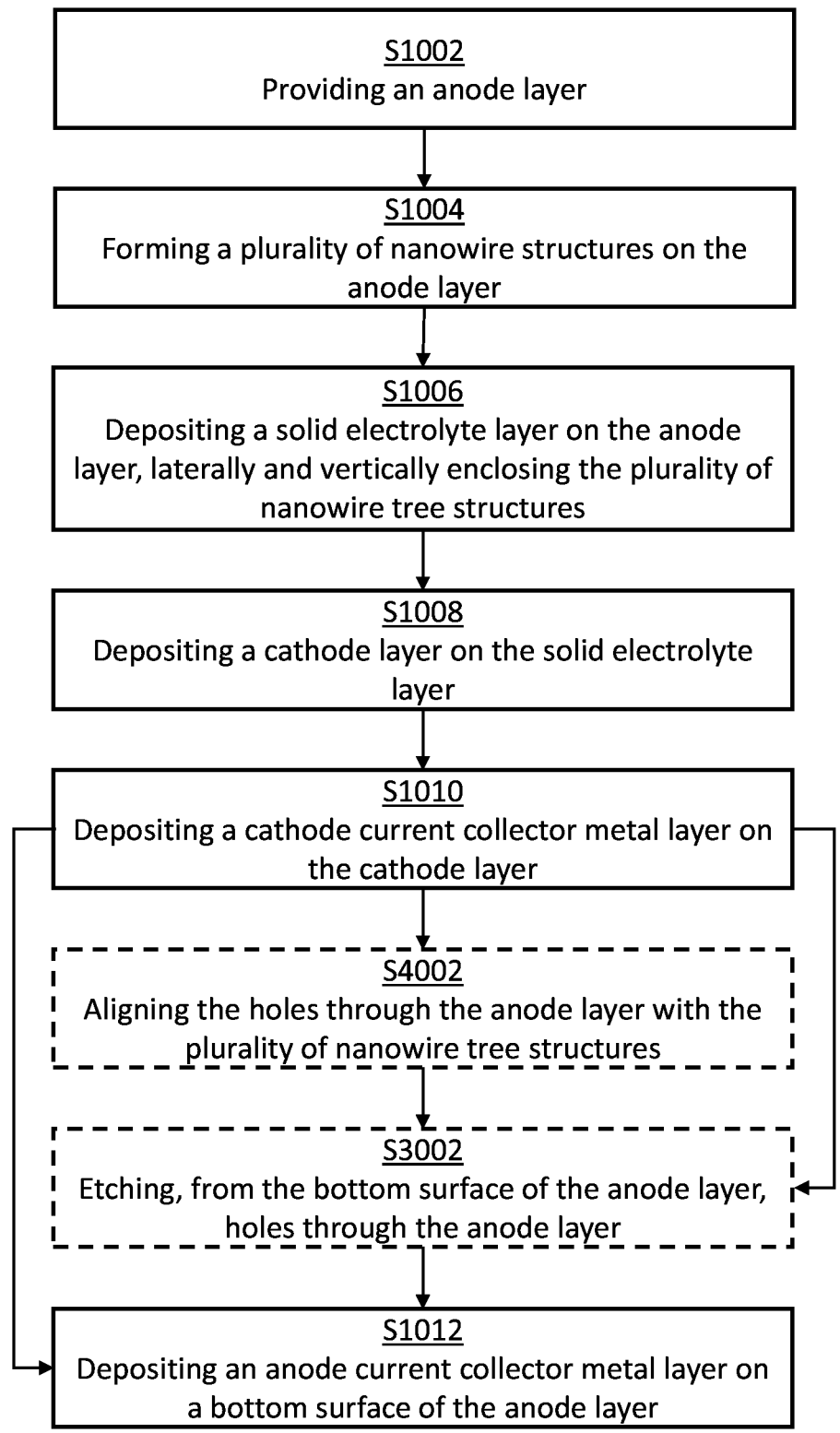
FIG. 4 shows a flowchart with steps for forming solid-state battery layer structures.

FIG. 4 shows a flowchart of a method for producing a solid-state battery layer structure 100. The method is shown to comprise steps of:
- providing S1002 an anode layer 120;
- forming S1004 a plurality of nanowire structures 130 on the anode layer 120, each nanowire structure 130 comprising a vertical stem 132 and a plurality of branches 134 extending from the vertical stem 132, wherein the vertical stems 132 of the nanowire structures 130 are formed perpendicularly to a top surface 122 of the anode layer 120;
- depositing S1006 a solid electrolyte layer 140 on the anode layer 120, the solid electrolyte layer 140 laterally and vertically enclosing said plurality of nanowire structures 130;
- depositing S1008 a cathode layer 150 on the solid electrolyte layer 140;
- depositing S1010 a cathode current collector metal layer 160 on the cathode layer 140; and
- depositing S1012 an anode current collector metal layer 110 on a bottom surface 326 of the anode layer 120.

The plurality of nanowires structures 130 may be formed by a MOVPE, or a CVD process. The process may be seed particle mediated. The pattern in which the nanowire structures 130 are arranged may be formed using lithography techniques such as ultra-violet lithography (UVL), electron beam lithography (EBL), and nanoimprint lithography (NIL). Pattern transfer may be achieved through etching methods.

Nanosphere lithography (NSL) may be used together with chlorine-based plasma etching to etch out entire vertical stems 132. As such, the need for MOVPE may be circumvented, at least for the formation of the vertical stems 132. The nanowire structures 130 may be passivated in-situ before, during, or after MOVPE processing. The nanowire structure 130 may be passivated with hydrogen.

The method may further comprise incorporating or alloying lithium into the surface or bulk lattice of the nanowire structures 130. This may be achieved through electrochemical processing. Lithium may be deposited onto the nanowire structures 130 before solid electrolyte layer 140 deposition S1006. Lithium may be deposited by thermal evaporation.

The solid electrolyte layer 140 may be deposited S1006 by a CVD process. The solid electrolyte layer 140 may be deposited by PVD or sputtering process. The sputtering process may be a pulsed DC (direct current) or RF (radio frequency) based sputtering process. The solid electrolyte layer 140 may encapsulate any lithium deposited onto the nanowire structures 130.

The cathode layer 150 may be deposited S1008 by a CVD process. The cathode current collector metal layer 160 may be deposited S1010 by a PVD process. The anode current collector metal layer 110 may be deposited S1012 by a PVD process.

FIG. 4 also shows how the method may further comprise etching S3002, from the bottom surface 326 of the anode layer 120, holes 328 through the anode layer 120. In this eventuallity, the step of depositing S1012 the anode current collector metal layer 110 on the bottom surface 326 of the anode layer 120 further comprises filling the holes 328 with a same material as a material of the anode current collector metal layer 110. The filled in holes 328 may correspond to the vias 224 in FIG. 3.

Also shown in FIG. 4, the method may further comprise aligning S4002 the holes 328 through the anode layer 120 with said plurality of nanowire structures 130 i.e. so that each hole 328 corresponds to the position of a nanowire structure 130.

The holes 328 may be etched S3002 by a reactive ion etching (RIE) process. The RIE process may be a dry RIE process.

FIGS. 5a-5h show cross sectional views of layers and structures of the solid-state battery layer structure 100 during various stages of its production.

Figure 5A:
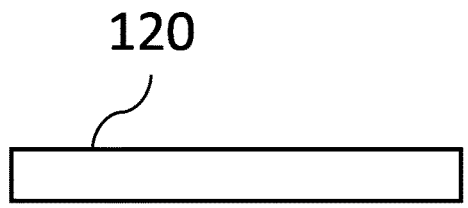
FIG. 5a-h show cross sections of a solid-state battery layer structure during various stages of its production.

FIG. 5a shows the anode layer 120 having been provided S1002, the anode layer 120 being the base for subsequent processing steps.

Figure 5B:
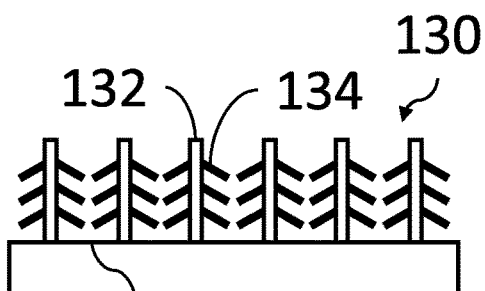

FIG. 5b shows the plurality of nanowire structures 130, each comprising vertical stems 132 and branches 134, having been formed S1004 wherein the vertical stems 132 of the nanowire structures 130 are formed perpendicularly to the top surface 122 of the anode layer 120.

Figure 5C:
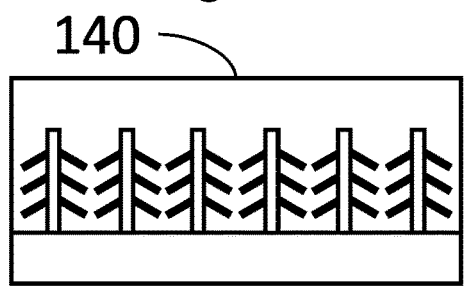

FIG. 5c shows the solid electrolyte layer 140 having been deposited S1006 on the anode layer 120 such that it laterally and vertically encloses the plurality of nanowire structures 130.

Figure 5D:
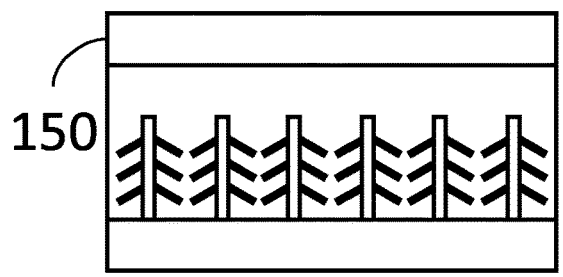

FIG. 5d shows the cathode layer 150 having been deposited S1008 on the solid electrolyte layer 140.

Figure 5E:
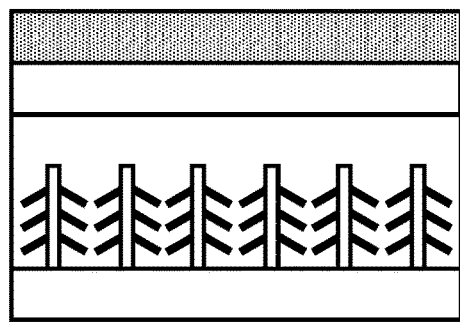

FIG. 5e shows the cathode current collector metal layer 160 having been deposited S1010 on the cathode layer 150. The battery layer structure may be flipped after step S1010 in order to accommodate subsequent processing steps.

Figure 5F:
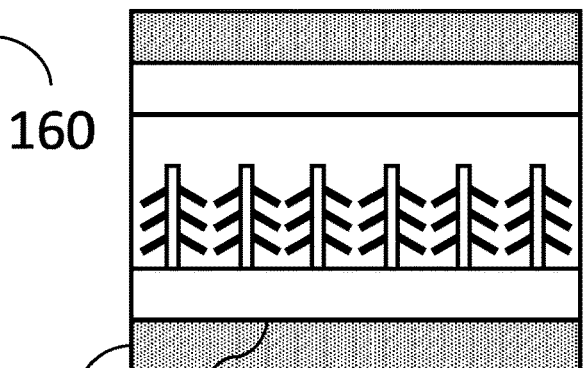

FIG. 5f shows the anode current collector metal layer 110 having been deposited S1012 on the bottom surface 326 of the anode layer 120, thus completing the solid-state battery layer structure 100.

Figure 5G:
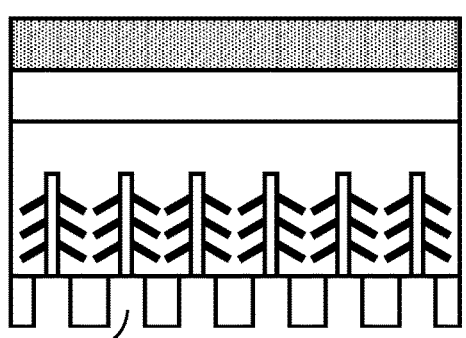
Figure 5H:
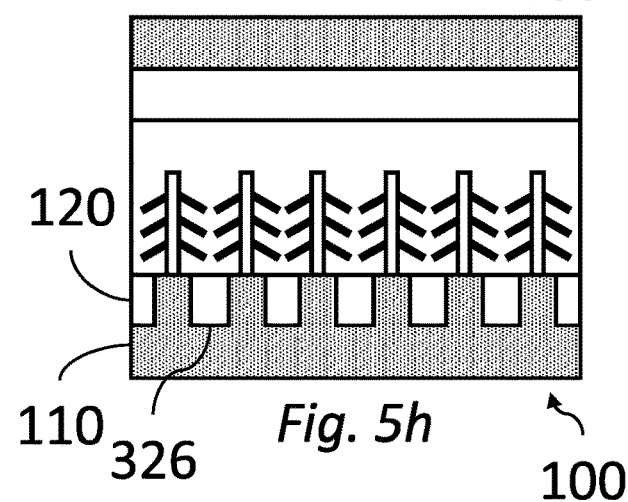

FIGS. 5g-h show an alternative route to complete the layer structure 100 compared to the route shown in FIG. 5f.

FIG. 5g shows the holes 328 having been etched S3002 from the bottom through the anode layer 120, from its bottom surface 326. The holes 328 are also shown to have been aligned S4002 with the nanowire structures 130.

FIG. 5h shows the anode current collector metal layer 110 having been deposited S1012 on the bottom surface 326 of the anode layer 120 and into the holes 328 through the anode layer 120, thus completing the solid-state battery layer structure 100.

Figure 6:
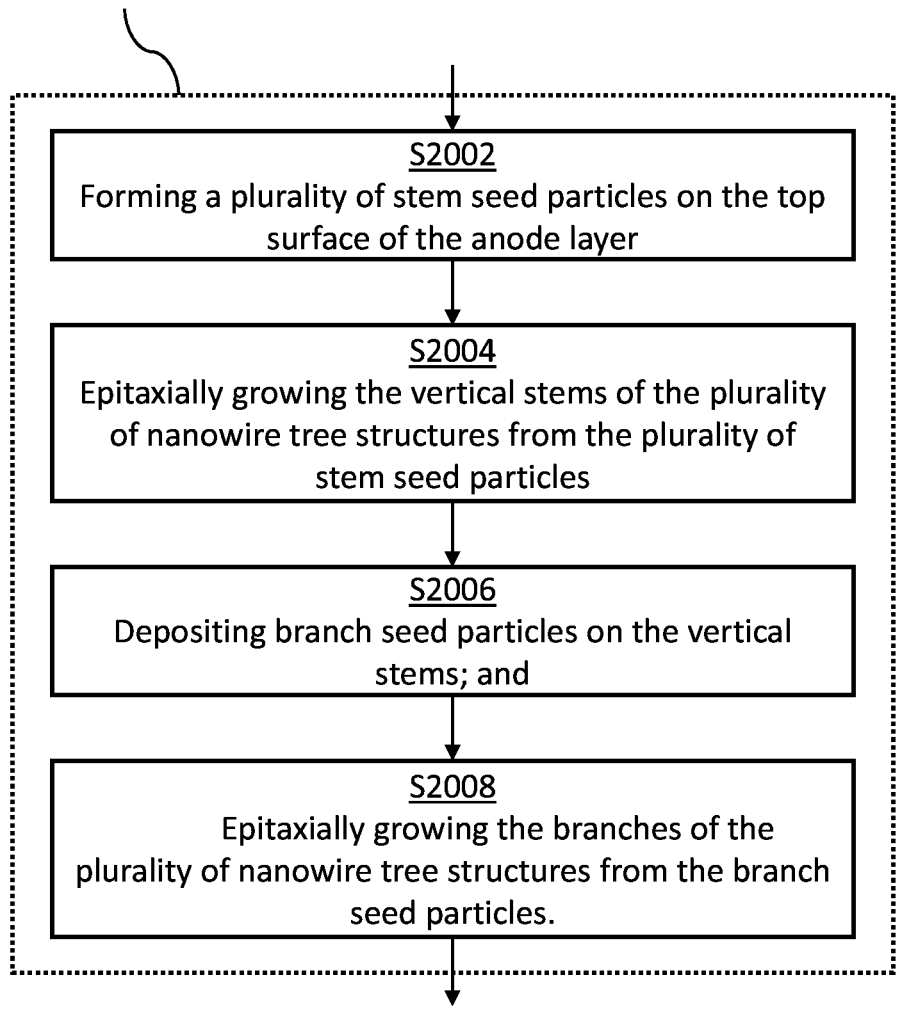
FIG. 6 shows a flowchart with steps for forming nanowire structures.

FIG. 6 shows a flowchart of the step of forming S1004 said plurality of nanowire structures 130. The step S1004 may comprise:

forming S2002 a plurality of stem seed particles 436 on the top surface 122 of the anode layer 120;

epitaxially growing S2004 the vertical stems 132 of said plurality of nanowire structures 130 from said plurality of stem seed particles 436;

depositing S2006 branch seed particles 438 on the vertical stems 132; and epitaxially growing S2008 the branches 134 of said plurality of nanowire structures 130 from said branch seed particles 438.

The stem seed and branch seed particles 436, 438 may be e.g. gold seed particles. The stem seed and branch seed particles 436, 438 may comprise other materials than gold such as e.g. silver, palladium, cobalt, bismuth, and platina. The stem seed and branch seed particles 436, 438 may be deposited using aerosol deposition. Deposition or formation of the plurality of seed particles 436, 438 may be formed with or without preferred co-alignment onto their respective surfaces or structures. The stem seed particle 436 may be formed using lithography-based patterning techniques. Such a technique may include forming a gold layer onto the anode layer 120 through electroplating, evaporation, or sputtering followed by lithography-based patterning, e.g. with resist coating, exposure, and etching steps to achieve a well-defined pattern of remaining stem seed particles 436 on the top surface 122 of the anode layer 120.

The nanowire structures 130 may be grown using seed particle mediated epitaxy. Essentially, this may mean that crystalline nanowire structures 130 are epitaxially grown from the seed particles 436, 438. The seed particles 436, 438 may first absorb precursor gases.

FIGS. 7a-d show a cross sectional, or side views, of nanowire structures 130 during different stages of their formation.

Figure 7A:
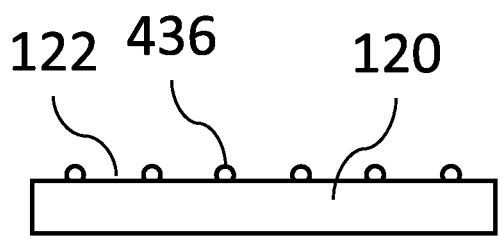
FIG. 7a-d show cross sections of nanowire structures during different stages of their formation.

FIG. 7a shows a plurality of stem seed particles 436 having been formed S2002 on the top surface 122 of the anode layer 120.

Figure 7B:
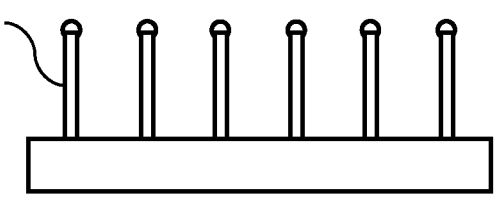

FIG. 7b shows the vertical stems 132 having been epitaxially grown S2004.

Figure 7C:
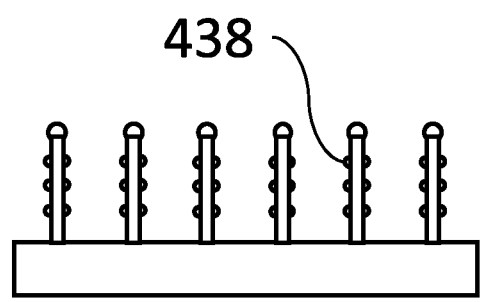

FIG. 7c shows branch seed particles 438 having been deposited S2006 on the vertical stems 132.

Figure 7D:
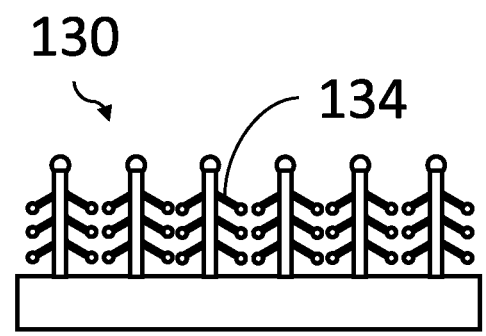

FIG. 7d shows the branches 134 having been epitaxially grown S2008.

Additionally, variations to the disclosed embodiments can be understood and effected by the skilled person in practicing the claimed invention, from a study of the drawings, the disclosure, and the appended claims.

The invention claimed is:

1. A method for producing a solid-state battery layer structure, the method comprising:

providing an anode layer comprising silicon;

forming a plurality of nanowire structures comprising silicon and/or gallium nitride on the anode layer, wherein the nanowire structures are formed perpendicularly to a top surface of the anode layer;

depositing a solid electrolyte layer on the anode layer, the solid electrolyte layer laterally and vertically enclosing said plurality of nanowire structures;

depositing a cathode layer on the solid electrolyte layer;

depositing a cathode current collector metal layer on the cathode layer;

etching, from a bottom surface of the anode layer, holes through the anode layer;

filling the holes with an electrically conducting material; and depositing an anode current collector metal layer on a bottom surface of the anode layer.

2. The method according to claim 1, wherein the material used for filling the holes is a same material as a material of the anode current collector metal layer.

3. The method according to claim 1, further comprising aligning the holes through the anode layer with said plurality of nanowire structures.

4. The method according to claim 1, wherein the step of forming said plurality of nanowire structures comprises:

forming a plurality of stem seed particles on the top surface of the anode layer;

epitaxially growing the vertical stems of said plurality of nanowire structures from said plurality of stem seed particles;

depositing branch seed particles on the vertical stems; and epitaxially growing branches of said plurality of nanowire structures from said branch seed particles.

5. The method according to claim 1, further comprising depositing an upper sublayer of gallium nitride on the anode layer such that the anode layer comprises a lower sublayer of silicon and the upper sublayer of gallium nitride.

6. The method according to claim 4, further comprising passivating the anode layer with hydrogen.

7. The method according to claim 1, further comprising incorporating or alloying lithium into the anode layer.

* * * * *